US008582223B1

(12) United States Patent
Garani et al.

(10) Patent No.: US 8,582,223 B1
(45) Date of Patent: Nov. 12, 2013

(54) METHODS AND DEVICES FOR TWO-DIMENSIONAL ITERATIVE MULTI-TRACK BASED MAP DETECTION

(75) Inventors: Shayan S. Garani, Irvine, CA (US); Yiming Chen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 164 days.

(21) Appl. No.: 13/363,155

(22) Filed: Jan. 31, 2012

(51) Int. Cl.
*G11B 5/09* (2006.01)
*G11B 20/14* (2006.01)
*H03D 1/06* (2006.01)

(52) U.S. Cl.
USPC ............................................. 360/40; 375/348

(58) Field of Classification Search
None
See application file for complete search history.

(56) References Cited

U.S. PATENT DOCUMENTS

| | | | |
|---|---|---|---|
| 7,555,070 B1 | 6/2009 | Ulriksson et al. | |
| 7,788,572 B1 | 8/2010 | Ulriksson | |
| 8,194,801 B1 | 6/2012 | Bitran et al. | |
| 2006/0115029 A1 * | 6/2006 | Marrow | ........................ 375/348 |

OTHER PUBLICATIONS

Notice of Allowance dated Jul. 8, 2013 in U.S. Appl. No. 13/404,380, 13 pages.
R. Wood, M. Williams, A. Kavcic, and J. Miles, "The Feasibility of Magnetic Recording at 10 Terabits Per Square Inch on Conventional Media," IEEE Trans. Magn., vol. 45, No. 2, pp. 917-923, Feb. 2009.
L. R. Bahl, J.Cocke, F.Jelinek and J.Raviv, "Optimal decoding of linear codes for minimizing symbol error rate," IEEE Trans. Inform. Theory., vol. 20, Mar. 1974, pp. 284-287.
E. Ordentlich and R. Roth, "On the Computational Complexity of 2D Maximum-likelihood Sequence Detection," Hewlett-Packard Labs, Palo Alto, CA, 2006, Tech. Rep. HPL-2006-69, 15 pgs.
J. K. Nelson, A. C. Singer, and U. Madhow, "Multi-directional Decision Feedback for 2D Equalization," in Proc. IEEE Intl. Conf. on Acoust. Speech and Signal Proc. ICASSP'04, vol. 4, May 2004, pp. 921-924.
Y. Wu, J. A. O'Sullivan, R. S. Indeck, and N. Singla, "Iterative Detection and Decoding for Separable Two-Dimensional Intersymbol Interference," IEEE Trans. Magn., vol. 39 Jul. 2003, pp. 2115-2120.
O. Shental, N. Shental, S. Shamai, I. Kanter, A. J. Weiss, and Y. Weiss, "Discrete-Input Two-Dimensional Gaussian Channels With Memory: Estimation and Information Rates via Graphical Models and Statistical Mechanics," IEEE Trans. Inform. Theory., vol. 54, Apr. 2008, pp. 1500-1513.

(Continued)

*Primary Examiner* — Daniell L Negron

(57) ABSTRACT

Decoding data written over a plurality of tracks includes selecting a mask that accounts for Inter-Symbol-Interference, the mask including channel coefficients and defining a trellis defining a plurality of states; receiving a signal corresponding to an input pixel from each of the plurality of tracks and generating equalized samples therefrom; computing transition branch probabilities for each input vector based on a Gaussian noise distribution using the equalized samples, ideal samples and a priori probabilities of the input vector; computing forward and backward probabilities via recursions using the computed transition branch probabilities; combining the forward, backward and transition branch probabilities to generate a-posteriori probabilities for the input vector; marginalizing the a-posteriori probabilities over values of neighboring pixels to generate an a-posteriori probability for a pixel of the input vector in a given state, and decoding the pixel as a first or second logical state from the marginalized a-posteriori probabilities.

26 Claims, 9 Drawing Sheets

(56) References Cited

OTHER PUBLICATIONS

Y. Chen, T. Cheng, P. Njeim, B. Belzer, and K. Sivakumar, "Iterative Soft Decision Feedback Zig-Zag Equalizer for 2D Intersymbol Interference Channels," IEEE Jour. on Sel. Areas in Comm., vol. 28, Feb. 2010, pp. 1-14.

C. Berrou and A. Glavieux, "Near Shannon Limit Error-correcting Coding and Decoding: Turbo Codes," IEEE Trans. Comm., vol. 44, Oct. 1996, pp. 1064-1070.

S. G. Srinivasa, O. Momtahan, A. Karbaschi, S. W. McLaughlin, F. Fekri, and A. Adibi, "Volumetric Storage Limits and Space-Volume Multiplexing Tradeoffs for Holographic Channels," Opt. Eng., vol. 49, Jan. 2010, pp. 1-9.

C. L. Miller, B. R. Hunt, M. W. Marcellin, and M. A. Neifeld, "Image restoration using the Viterbi algorithm," Jour. of the Opt. Soc. of America A., vol. 17, No. 2, Feb. 2000, pp. 265-274.

M. Tuchler, R. Koetter and A. Singer, "Turbo equalization: Principles and New Results," IEEE. Trans. Comm., vol. 50, No. 5, pp. 754-767, May 2002.

S. Jeong and J. Moon, "Self-Iterating Soft Equalizer," accepted to IEEE. Trans. Communication, 6 pgs.

Steve Hranilovic, Member, IEEE, and Frank R. Kschischang, Fellow, "A Pixelated MIMO Wireless Optical Communication System", IEEE Journal of Selected Topics in Quantum Electronics, vol. 12, No. 4, Jul./Aug. 2006, pp. 859-874.

Chan Kheong Sann et al., "Channel Models and Detectors for Two-Dimensional Magnetic Recording (TDMR)", IEEE Transactions on Magnetics, vol. 46, No. 3, Mar. 2010, pp. 804-811.

X. Chen, K. M. Chugg, and M. A. Neifeld "Near-optimal data detection for two dimensional ISI/AWGN channels using concatenated modeling and iterative algorithms," in Proc. IEEE International Conference on Communications, ICC98, 1998, pp. 952-956.

M. Marrow, and J. K. Wolf, "Iterative Detection of 2-Dimensional ISI Channels," in Proc. Inf. Theory Workshop, Paris, France, pp. 131-134, Mar./Apr. 2003.

S. G. Srinivasa, and S. W. McLaughlin, "Capacity Bounds for Two-Dimensional Asymmetric M-ary $(0, k)$ and $(d,\$)$ Runlength-Limited Channels," IEEE Trans. Comm., vol. 57, No. 6, pp. 1584-1587, Jun. 2009.

S. ten Brink, "Convergence behavior of iteratively decoded parallel concatenated codes," IEEE Trans. Commun., vol. 49, pp. 1727-1737, Oct. 2001.

\* cited by examiner

☐ *a-priori* information from previous detector

METHODS AND DEVICES FOR TWO-DIMENSIONAL ITERATIVE MULTI-TRACK BASED MAP DETECTION

BACKGROUND

Two-dimensional (2-D) intersymbol-interference (ISI) channels have become practically relevant in various data recording technologies such as two-dimensional magnetic recording (TDMR), optical holographic memories as well as in other areas such as pixelated wireless optical channels and 2-D grid networks. From a signal processing viewpoint, data recording systems in 2-D have advantages over traditional 1-D systems. 2-D recording systems are less sensitive to timing instabilities due to wider tracks and hence not restrictive to the size of sensory read elements. With clever 2-D signal processing, guard bands between tracks can be avoided. This improves format efficiency. Lastly, if 2-D ISI can be handled beneficially to gain signal-to-noise ratio (SNR) by appropriate signal processing.

DETAILED DESCRIPTION

The emergence of 2-D ISI channels motivates the development of 2-D signal processing techniques for combatting ISI. There is a wide spectrum of 1-D detection techniques ranging from decision feedback equalization (DFE) to the optimal maximum a-posteriori (MAP) algorithm that can be extended to the 2-D case. 2-D DFE based methods are easy to implement but suffer from error propagation. The 1-D MAP algorithm is theoretically optimal and is the best-in-class detector for minimizing bit-error rate. However, unlike 1-D MAP detection that can be easily realized, 2-D MAP detection is in general NP-complete. It is difficult to realize a 2-D trellis that spans signal dimensions over 2-D blocks of data greater than just a few bits. Low complexity 2-D signal detection algorithms based on 1-D schemes are needed to approach 2-D MAP detection performance. Several authors have considered various approaches towards 2-D detection. Nelson et al. (J. K. Nelson, A. C. Singer, and U. Madhow, "Multi-directional Decision Feedback for 2D Equalization," in Proc. IEEE Intl. Conf. on Acoust. Speech and Signal Proc. ICASSP'04, vol. 4, pp. 921-924, May 2004) derived a multi-dimensional decision feedback scheme for 2-D equalization. Wu et al. (Y. Wu, J. A. O'Sullivan, R. S. Indeck, and N. Singla, "Iterative Detection and Decoding for Seperable Two-Dimensional Intersymbol Interference," IEEE Trans. Magn., vol. 39, pp. 2115-2210, July 2003) developed 2-D iterative detection and decoding scheme for a separable 2-D ISI system. However, in most practical systems, 2-D ISI is not separable. Shental et al. (O. Shental, N. Shental, S. Shamai, I. Kanter, A. J. Weiss, and Y. Weiss, "Discrete-Input Two-Dimensional Gaussian Channels With Memory: Estimation and Information Rates via Graphical Models and Statistical Mechanics," IEEE Trans. Inform. Theory., vol. 54, pp. 1500-1513, April 2008) developed a generalized belief propagation approach that achieves near ML performance for 2-D ISI channels. Simulations in Shental et al. considered (20×20) 2-D data sizes with smaller 2-D ISI masks (2×2) and low energy distribution on side taps; such cases are easily handled since nearby boundary conditions can aid the estimation algorithm. In a recent prior work, Chen et al. (Y. Chen, T. Cheng, P. Njeim, B. Belzer, and K. Sivakumar, "Iterative Soft Decision Feedback Zig-Zag Equalizer for 2D Intersymbol Interference Channels," IEEE Jour. on Sel. Areas in Comm., vol. 28, pp. 167-180, February 2010) developed an iterative soft-decision feedback zig-zag MAP algorithm. This method demonstrated performance close to nearly optimal detection and compared well with the method in Shental et al.

Figure 1:
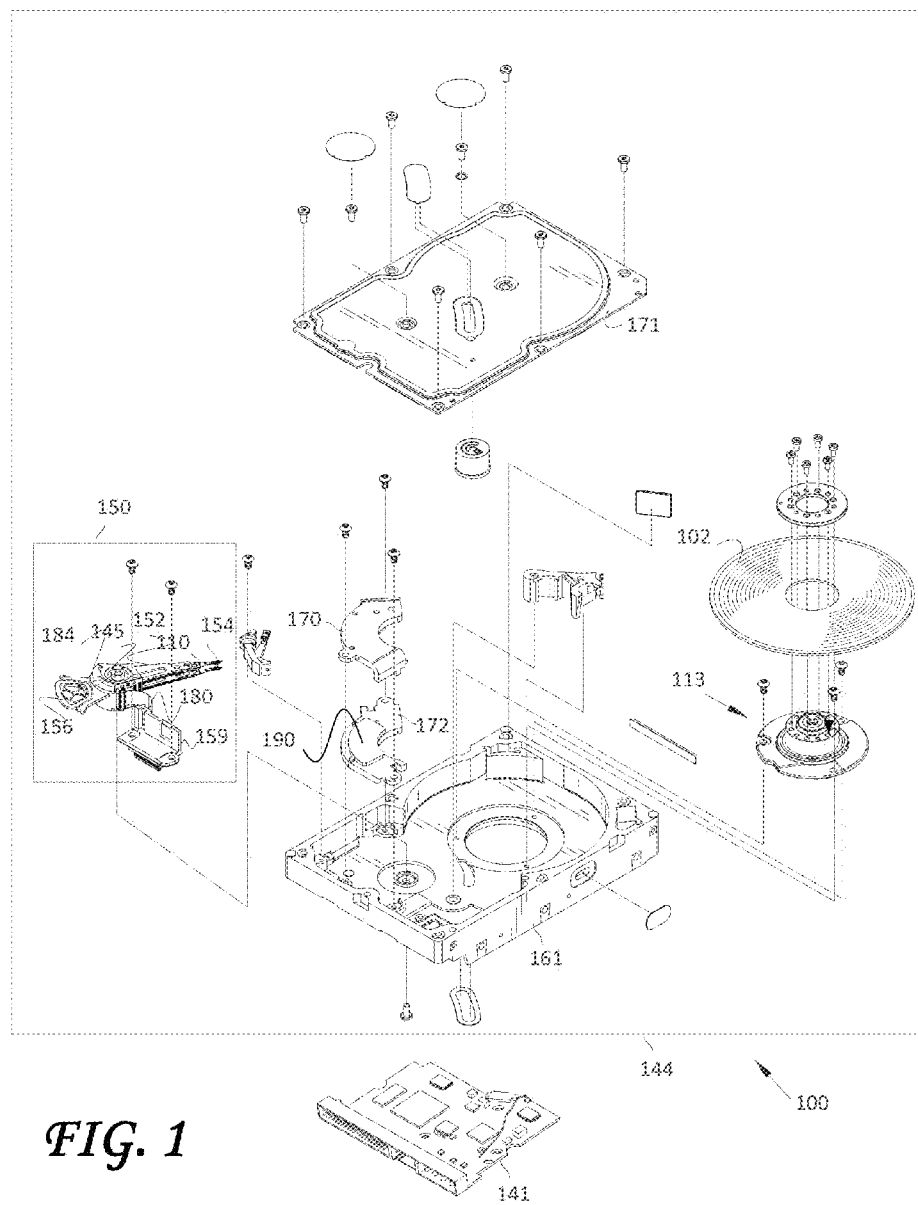
FIG. 1 shows the principal components of an exemplary magnetic disk drive constructed in accordance with one embodiment.

Some embodiments are directed to methods and systems for encoding and decoding data, including but not limited to data stored in a data storage device such as a disk drive. FIG. 1 shows the principal components of an exemplary magnetic disk drive 100 constructed in accordance with one embodiment. With reference to FIG. 1, the disk drive 100 comprises a head disk assembly (HDA) 144 and a printed circuit board assembly (PCBA) 141. The HDA 144 includes a base 161 and a cover 171 attached to the base 161 that collectively house a disk 102 (or a stack of two or more such disks 102), a spindle motor 113 attached to the base 161 for rotating the disk 102, an HSA 150, and a pivot bearing cartridge 184 (such as a stainless steel pivot bearing cartridge, for example) that rotatably supports the head stack assembly (HSA) 150 on the base 161. The spindle motor 113 rotates the disk 102 at a constant angular velocity. The HSA 150 comprises a swing-type or rotary actuator assembly 152, at least one head gimbal assembly (HGA) 110 coupled to the load beam 303 that includes a flexure constructed as described above, and a flex circuit cable assembly. The rotary actuator assembly 152 includes a body portion, at least one actuator arm cantilevered from the body portion, and a coil portion 156 cantilevered from the body portion in an opposite direction from the actuator arm. The actuator arm supports the HGA 110 that, in turn, includes and supports the slider(s). The flex circuit cable assembly may include the flexible cable 180 and a flex clamp 159. The flexible cable 180 and the flexure of the HGA 110 are structured and coupled in the manner described above. The HSA 150 is pivotally secured to the base 161 via the pivot-bearing cartridge 184 so that the slider at the distal end of the HGA 110 may be moved over the surfaces of the disk(s) 102. The pivot-bearing cartridge 184 enables the HSA 150 to pivot about a pivot axis. The storage capacity of the HDA 144 may be increased by, for example, increasing the track density (the TPI) on the disk 102 and/or by including additional disks 102 in a disk stack and by an HSA 150 having a vertical stack of HGAs 110 supported by a rotary actuator assembly 152 having multiple actuator arms. The "rotary" or "swing-type" actuator assembly 152 rotates on the pivot bearing 184 cartridge about its pivot axis between limited positions and further includes a coil portion 156 that extends from one side of the body portion to interact with one or more permanent magnets 190 mounted to back irons 170, 172 to form a voice coil motor (VCM). The VCM causes the HSA 150 to pivot about the actuator pivot axis to cause the slider and the read-write transducers thereof to sweep radially over the disk(s) 102. The PCBA 141 includes control circuitry configured to read data from and write data to the disk(s) 102. When reading data from the disk(s) 102, a read channel typically samples the read signal to generate sample is values that are equalized into a target response (e.g., a target partial response). A sequence detector detects an estimated data sequence from the equalized samples. According to one embodiment, one component of the control circuitry of the PCBA 141 that handles the data channel includes a multi-row/multi-column MAP detector. Indeed, one embodiment is an iterative multi-row/multi-column MAP detector with 2-D ISI that accounts for feedback information from neighboring bit cells outside the 2-D ISI span. One other embodiment is a 2-D iterative multi-row/column turbo-detector that is a low complexity 2-D detection containing two 1-D optimal detectors operating in orthogonal directions based on a turbo principle. Single row/column and multi-row/column variations are further illustrated in some embodiments. The trellis of the multi-row/column detector is compliant with the span of the 2-D ISI, while the single-row/column version is approximated by a simplified 1-D MAP trellis with much lower complexity.

Considering the detection of an M×N equiprobable 2-D independent and identically distributed (i.i.d.) binary signal x with elements $x(k,l) \in \{-1, +1\}$ from received image y with elements $$y(m,n) = g(m,n) + w(m,n) \quad (1)$$

where g(m, n) is the 2-D convolution, defined as $$g(m, n) = \sum_k \sum_l h(m-k, n-l) x(k, l) \quad (2)$$

In the above equations h(k, l) are the elements of a 2-D finite impulse response/2-D blurring mask and w(m, n) are zero mean independent and identically distributed i.i.d. Gaussian random variables (r.v.s). The double sum is computed over the support of h(m−k, n−l):S(m, n)=(k, l):h(m−k,n−l)≠0. The discrete model in (1) and (2) is applicable to many 2-D ISI channels post front-end signal processing after dealing with channel/media distortions and whitening the media noise.

Figures 2A, 2B:
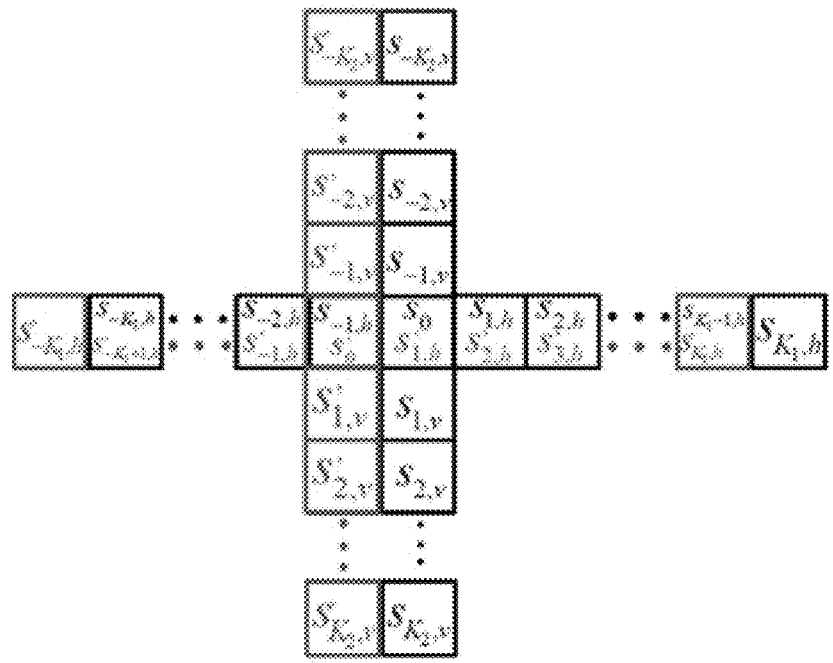
FIG. 2, which includes FIGS. 2(a)-(d), a mask for a 2-D channel according to one embodiment.
Figure 2C:
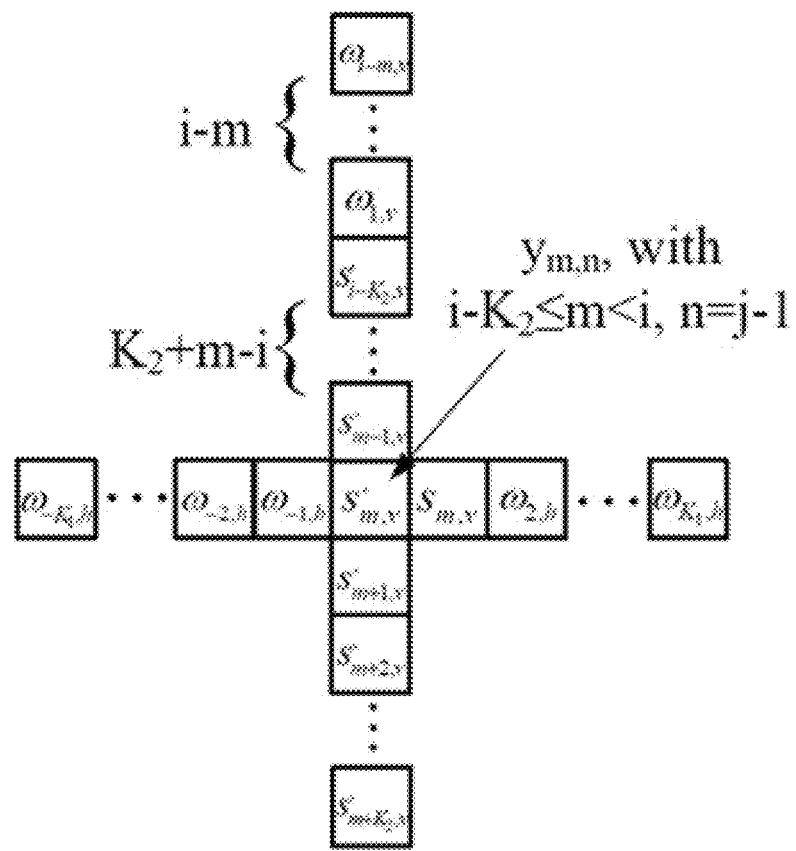
Figure 2D:
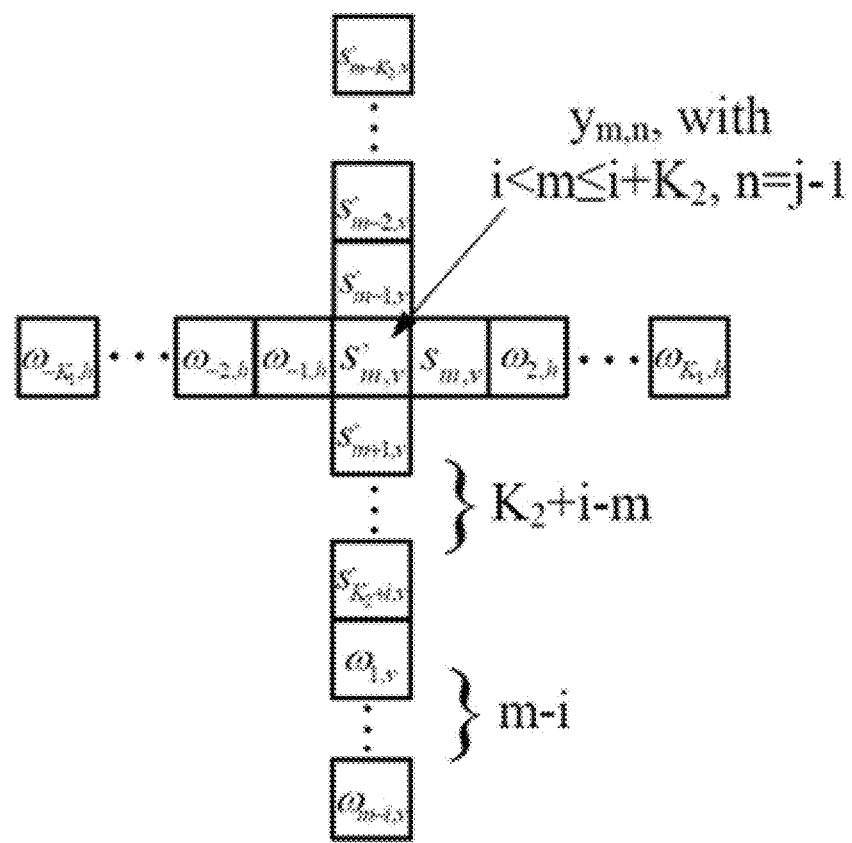

FIG. 2, which includes FIGS. 2(a)-(d), shows a mask for a 2-D channel, according to one embodiment. A generalized rectangular-shaped mask is shown in FIG. 2(a). The coefficients in the horizontal direction, i.e. $[\beta_{-K_1}, \ldots, \beta_{-1}, 1, \beta_1, \ldots, \beta_{K_1}]$ denote horizontal ISI; and the coefficients in the vertical direction, i.e. $[\alpha_{-K_2}, \ldots, \alpha_{-1}, 1, \alpha_1, \ldots, \alpha_{K_2}]$ denote vertical ISI. The size of this mask is $(2K_2+1) \times (2K_1+1)$. The coefficients with negative indices denote the causal part (i.e. the pre-cursor ISI); while the positive indices denote the anti-causal part (i.e. the post-cursor ISI). FIG. 2(b) shows the state definition and states transition (the previous state $S_{j-1}$=s' and the current state $S_j$=s) of the MAP trellis, 'h' denotes the horizontal direction and 'v' denotes the vertical direction. FIG. 2(c) shows the expectation computation for sample $y_{m,n}$ from received vector $\underline{y}_{i,j}$ with $i-K_2 \leq m < i$ and $n=j-1$. Lastly, FIG. 2(d) shows expectation computation from sample $y_{m,n}$ from received vector $\underline{y}_{i,j}$ with $i < m \leq i+K_2$ and $n=j-1$.

According to one embodiment, the shape of the 2-D mask may be selected so as to emphasize ISI contributions of adjacent pixels in the orthogonal directions over adjacent pixels in the diagonal directions. A 'pixel', as referred to herein, is a 2-D bit cell related to a 2-D sector or a bit cell in shingled magnetic recording, unlike the term "pixel" as used in cameras and imaging. Practical 2-D ISI channels in recording systems may be represented by the 'band-aid' shape mask shown in FIGS. 2(a), (b) and (c), according to one embodiment. The mask, however, may be selected to have a shape that emphasizes ISI contributions of adjacent pixels in the radial directions (for example, in hexagonal ISI due to hyper track recording in bit patterned media). In practice, the span of interference in each orthogonal direction i.e., ($K_1$ and $K_2$) is small. Diagonal interference may be sufficiently small as to be negligible. Therefore, as shown in FIGS. 2(a), (b) and (c), the 2-D ISI mask may be selected herein with zero coefficients along the diagonals. However, it is to be understood that the coefficients along the diagonals may be non-zero to account for non-zero diagonal interference without departing from the scope of the embodiments disclosed herein As in the conventional BCJR algorithm described in L. R. Bahl, J. Cocke, F. Jelinek, and J. Raviv, "Optimal decoding of linear codes for minimizing symbol error rate," IEEE Trans. Inform. Theory., vol. 20, pp. 284-287, March 1974), scans based on the forward-backward procedure may be carried out. In one embodiment, to compute the received image y, a boundary of −1 pixels is assumed around x; the detector uses this boundary condition so that the MAP trellis can begin and end in an 'all −1' state as demonstrated in Bahl et al., in which '−1' is the bi-polar mapping of an all zero logical state.

For the generalized 2-D mask shown in FIG. 2(a), given the trellis state $$S_j = s \triangleq [s_{-K_2,v}, \ldots, s_{-1,v}, s_{1,v}, \ldots, s_{+K_2,v}, s_0, s_{-K_1,h}, \ldots, s_{-1,h}, s_{1,h}, \ldots, s_{+K_1,h}], \quad (3)$$

the input vector $$\underline{u}_{i,j} = [u_{i-K_2,j}, u_{i-K_2+1,j}, \ldots, u_{i-1,j}, u_{i,j+K_1}, u_{i+1,j}, \ldots, u_{i+K_2-1,j}, u_{i+K_2,j}], \quad (4)$$

and the received vector sequence $\underline{Z}^{(i)} \triangleq \{\underline{y}_{i,j}\}_{1 \leq j \leq N}$, where the vector $\underline{y}_{i,j}$ is the local received samples for trellis stage j at ith row, defined as:

$$\underline{y}_{i,j} = [y_{i-k_2,j-1}, y_{i-k_2+1,j-1}, \ldots, y_{i-1,j-1}, y_{i,j}, y_{i+1,j-1}, \ldots, y_{i+K_2-1,j-1}, y_{i+K_2,j-1}], \quad (5)$$

and $$\lambda_{i,j}^{u_{i,j}}(s)$$

is defined as $$\lambda_{i,j}^{u_{i,j}}(s) \triangleq P(\underline{u}_{i,j}, S_j = s, \underline{Z}^{(i)}). \quad (6)$$

The a-posteriori probability may now be computed for this multi-row detector as $$P(\underline{u}_{i,j} | \underline{z}^{(i)}) = \sum_s \lambda_{i,j}^{u_{i,j}}(s) / P(\underline{Z}^{(i)}), \quad (7)$$

using a modified BCJR algorithm.
The following are defined:

$$\alpha_{i,j}(s) = P(S_j = s, \{\underline{y}_{i,a}\}_{1 \leq a \leq j}),$$

$$\beta_{i,j}(S) = P(\{\underline{y}_{i,a}\}_{j+1 \leq a \leq N} | S_j = s),$$

$$\gamma_{i,j}(s', s) = P(S_j = s, \underline{y}_{i,j} | S_{j-1} = s'); \quad (8)$$

the state transition probability γ may be computed at every stage along the trellis, and after all the γ's are available, the α's and β's may be updated based on the following equations using the forward-backward recursion, $$\alpha_{i,j}(s) = \sum_{z}' \alpha_{i,j-1}(s') Y_{i,j}(s', s), \quad (9)$$

$$\beta_{i,j-1}(s') = \sum_{z} \beta_{i,j}(s) Y_{i,j}(s', s), \quad (10)$$

After all the α's, δ's and γ's become available, the y probability in equation (6) may be computed as, $$\lambda_{i,j}^{u_{i,j}} = \sum_{s}' a_{i,j-1}(s') Y_{i,j}(s', s) \beta_{i,j}(s) \quad (11)$$

To estimate the pixel located at $(i, j+K_1)$ from the λ's, the λ's may be marginalized over all the other pixels in the input vector $\underline{u}_{i,j}$ as, $$\lambda_{i,j-K_1}^{u_{i,j}}(S_j - K_1) = \sum_{u_{i,j-K_1} \setminus u_{i,j}} \lambda_{i,j-K_1}^{u_{i,j-K_1}}(S_{j-K_1}). \quad (12)$$

The delay of $K_1$ of the index accounts for the ISI shape and boundary conditions.

The output pixel LLR may be computed as:

$$L(i, j) = \ln \left( \frac{\sum_{S_{j-K_1}} \lambda_{i,j-K_1}^{u_{i,j}=+1}(S_{j-K_1})}{\sum_{S_{j-K_1}} \lambda_{i,j-K_1}^{u_{i,j}=-1}(S_{j-K_1})} \right). \quad (13)$$

If L(i, j)>0 pixel (i, j) may be detected as +1; otherwise pixel (i, j) may be detected as −1.

The conditional probability $\gamma_{i,j}(s', s)$ is decomposed to the product of two other conditional probabilities based on Bayesian rule:

$$\begin{aligned} \gamma_{i,j} = (s', s) &= P\left(S_j = s, \underline{y}_{i,j} \mid S_{j-1} = s'\right) \\ &= P\left(\underline{y}_{i,j} \mid S_j = s, S_{j-1} = s'\right) P(S_j = s \mid S_{j-1} = s') \\ &= P\left(\underline{y}_{i,j} \mid S_j = s, S_{j-1} = s'\right) P(\underline{u}_{i,j}). \end{aligned} \quad (14)$$

The last equality holds in (14), because the input is the branch connecting two adjacent stages, and this vector determines the next state given the current state. For the non-iterative detection embodiment, there is no a-priori information. It is assumed in that case that all the input pixels are equally likely when computing $P(u_{i,j})$ in equation (14). Since the first conditional probability in the product of (14) is Gaussian distributed, it may be computed it as, $$\begin{aligned} P\left(\underline{y}_{i,j} \mid S_j = s, S_{j-1} = s'\right) \\ \approx P(y_{i,j} \mid S_j = s, S_{j-1} = s') \end{aligned} \quad (15)$$

$$\begin{aligned} \prod_{m=-K_2, m \neq 0}^{K_2} P(y_{i+m,j-1} \mid S_j = s, S_{j-1} = s') \\ = \frac{1}{\sqrt{2\pi}\,\sigma_\omega} \exp\left(-\frac{(y_{i,j} - \overline{y_{i,j}})^2}{2\sigma_\omega^2}\right) \\ \prod_{m=-K_2, m \neq 0}^{K_2} \frac{1}{\sqrt{2\pi}\,\sigma_\omega} \exp\left(-\frac{(y_{i+m,j-1} - \overline{y_{i+m,j-1}})^2}{2\sigma_\omega^2}\right). \end{aligned}$$

In one embodiment, in the second step of equation (15), it is assumed that all the conditional probabilities are statistically independent of each other. This may not be is true for larger ISI spans, but this assumption is a reasonable practical approximation to realize the algorithm. For the conditional probabilities in equation (15), the expectations are computed based on the index (m, n) of the received sample y and the components of the 2D mask shown in FIG. 2(a). Given m=i and n=j, the expectation is, $$\overline{y_{m,n}} = s_0 + \prod_{p=-K_2, p \neq 0}^{K_2} \alpha_p s_{p,v} + \prod_{p=-K_1, p \neq 0}^{K_1} \beta_p s_{p,h}. \quad (16)$$

Given $i-K_2 \leq m < i$ and $n = j-1$, the expectation is, $$\overline{y_{m,n}} = s'_{m,v} + \sum_{p=1}^{K_2} \alpha_p s'_{m+p,v} + \sum_{p=1}^{K_2+m-i} \alpha_{-p} s'_{m-p,v} + \quad (17)$$

$$\prod_{p=K_2+m-i+1}^{K_2} \alpha_{-p} \omega_{p-K_2-m+i,v} + s_{m,v}\beta_1 + \sum_{p=1}^{K_1} \beta_{-p} \omega_{-p,h} + \sum_{p=1}^{K_2} \beta_p \omega_{p,h}.$$

There are i−m feedback pixels in vertical direction, (i.e., $\omega_{1,v}$ through $\omega_{i-m,v}$), and $2K_1-1$ feedback pixels in the horizontal direction, (i.e., $\omega_{2,h}$ through $\omega_{K_1,h}$ and $\omega_{-K_1,h}$ through $\omega_{-1,h}$), as also shown in FIG. 2(c).

Given $i < m \leq i+K_2$ and $n=j-1$, the expectation is, $$\overline{y_{m,n}} = s'_{m,v} + \sum_{p=1}^{K_2} \alpha_p s'_{m-p,v} + \sum_{p=1}^{K_2-m+i} \alpha_p s'_{m+p,v} + \quad (18)$$

$$\prod_{p=K_2-m+i+1}^{K_2} \alpha_p \omega_{p-K_2+m-i,v} + s_{m,v}\beta_1 + \sum_{p=1}^{K_1} \beta_{-p} \omega_{-p,h} + \sum_{p=1}^{K_2} \beta_p \omega_{p,h}.$$

There are m−i feedback pixels in vertical direction, (i.e., $\omega_{1,v}$ through w and $2K_1-1$ feedback pixels in the horizontal direction, (i.e., $\omega_{2,h}$ through $\omega_{K_1,h}$ and $\omega_{-K_1,h}$ through $\omega_{-1,h}$), as also shown in FIG. 2(d).

In one embodiment, the total number of the feedback pixels in the vertical direction is |i−m| which will change with the index m; while the total number of feedback pixels in the horizontal direction is a constant $2K_1-1$.

Figure 3:
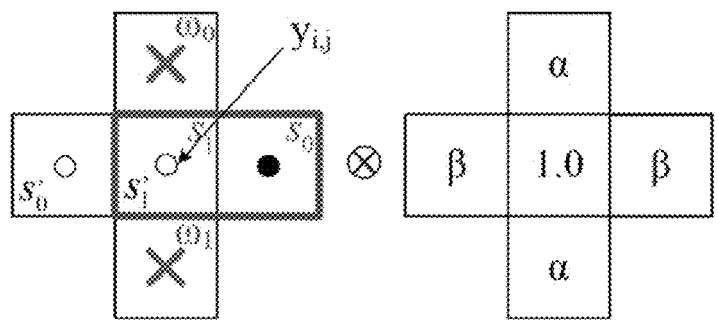
FIG. 3 shows the states, inputs and inner product definition for a simplified MAP trellis on a single row, according to one embodiment.

FIG. 3 shows the states, inputs and inner product definition for a simplified MAP trellis on a single row, according to one embodiment. In FIG. 3, $S_{j=\{S_0, S_1\}}$ and $S_{j-1=\{s'_0, s'_1\}}$. For a 3×3 mask as shown in FIG. 3, there are 5 state pixels contributing to 32 states configuration and 3 input pixels contributing to 8 branches in/out from one state of the trellis to the other. In FIG. 3, s' denotes the prior state and s denotes the next state. It is to be understood that other mask sizes such as, for example, 5×5, may be selected, albeit with higher complexity.

Figure 4:
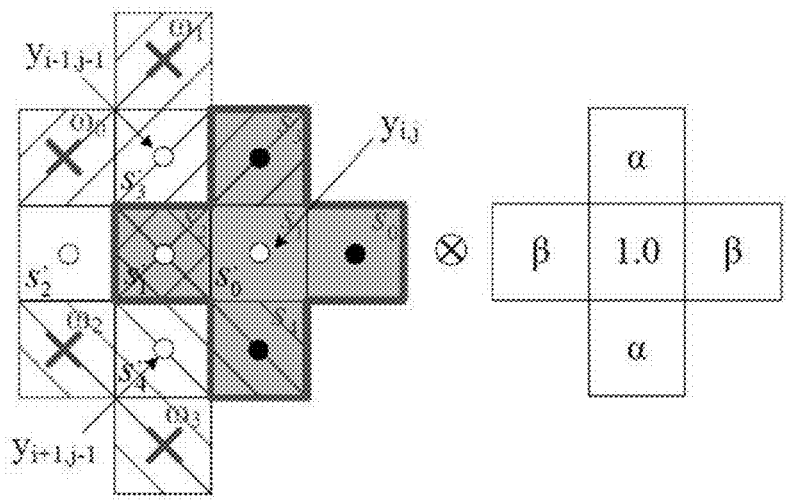
FIG. 4 shows the states, inputs and inner product definition for a MAP trellis on multi-rows, according to one embodiment.

FIG. 4 shows the states, inputs and inner product definition for a MAP trellis on multi-rows, according to one embodiment. The shape of the mask may be dependent on the layout of the tracks of the disk(s) 102. For instance, in hyper-track recording, the shape of the mask may be hexagonal, consistent with the written tracks. In the case of centered writing, the mask shape may be rectangular. According to one embodiment, the mask may be selected, for ISI considerations for data stored on adjacent tracks of a disk drive, to be a 2-D 'band-aid' or "cross-shape" type of mask, as shown in FIG. 4. According to one embodiment, the mask may be selected to have a hexagonal shape. The ISI may be chosen as a symmetric response for illustration purposes. This however does not restrict the embodiment, which may be extended to a more general case.

$$h = \begin{bmatrix} 0 & \alpha & 0 \\ \beta & 1 & \beta \\ 0 & \alpha & 0 \end{bmatrix}$$

The selection of the mask may include selecting a shape (through selection of the channel coefficients) so as to emphasize ISI contributions of adjacent pixels in an orthogonal direction over adjacent pixels in a diagonal direction. Accordingly, the channel coefficients at the corners of the channel model h above may be selected to be zero. Since the ISI is spanning 3 rows, a local span of 3 rows and 3 columns may be considered in one embodiment. In general, a 2-D trellis must span over the entire 2-D signal span and the forward backward technique must be computed at each point over the entire signal span. Thus the worst case complexity is $N^4$ assuming an N×N size 2-D data sector.

Let $\{y_{i,j}\}$ denote the set of received samples. In reality for TDMR, these will be equalized samples post front-end signal processing. A 'pixel', as referred to herein, is a 2-D bit cell related to a 2-D sector or a bit cell in a shingled setup, unlike the term "pixel" as used in cameras and imaging. The current state is defined as the 2-D "band-aid" type shape shown in thick lines in FIG. 4. In FIG. 4, the previous state is shown as 'o' circles. The overlap between the states is 2 pixels horizontally. The inputs will be the three elements $[s_0 s_3 s_4]$ that correspond to the bits at locations $[(i,j+1)(i-1,j)(i+1,j)]$ respectively. The pixels $[w_0 w_1]$ from locations $[(i-1,j-2)(i-2,j-1)]$ influence the pixel state at location $(i-1,j-1)$. Similarly pixels/bits $[w_2 w_3]$ from locations $[(i+1,j-2)(i+2,j-1)]$ influence the pixel state at location $(i+1,j-1)$. These pixels can be considered as feedback pixels. When the engine is run, usually feedback pixels values are unknown. Hence the stand-alone non-iterative detector estimates the value of the pixel at locations $(i-1,j-1)$ and $(i+1,j-1)$ by marginalizing over the pixels around its vicinity that are outside the trellis. A boundary of all zero pixels bi-polar mapped to '−1' may be used so that trellis warm up and closure is appropriately handled.

Figure 5:
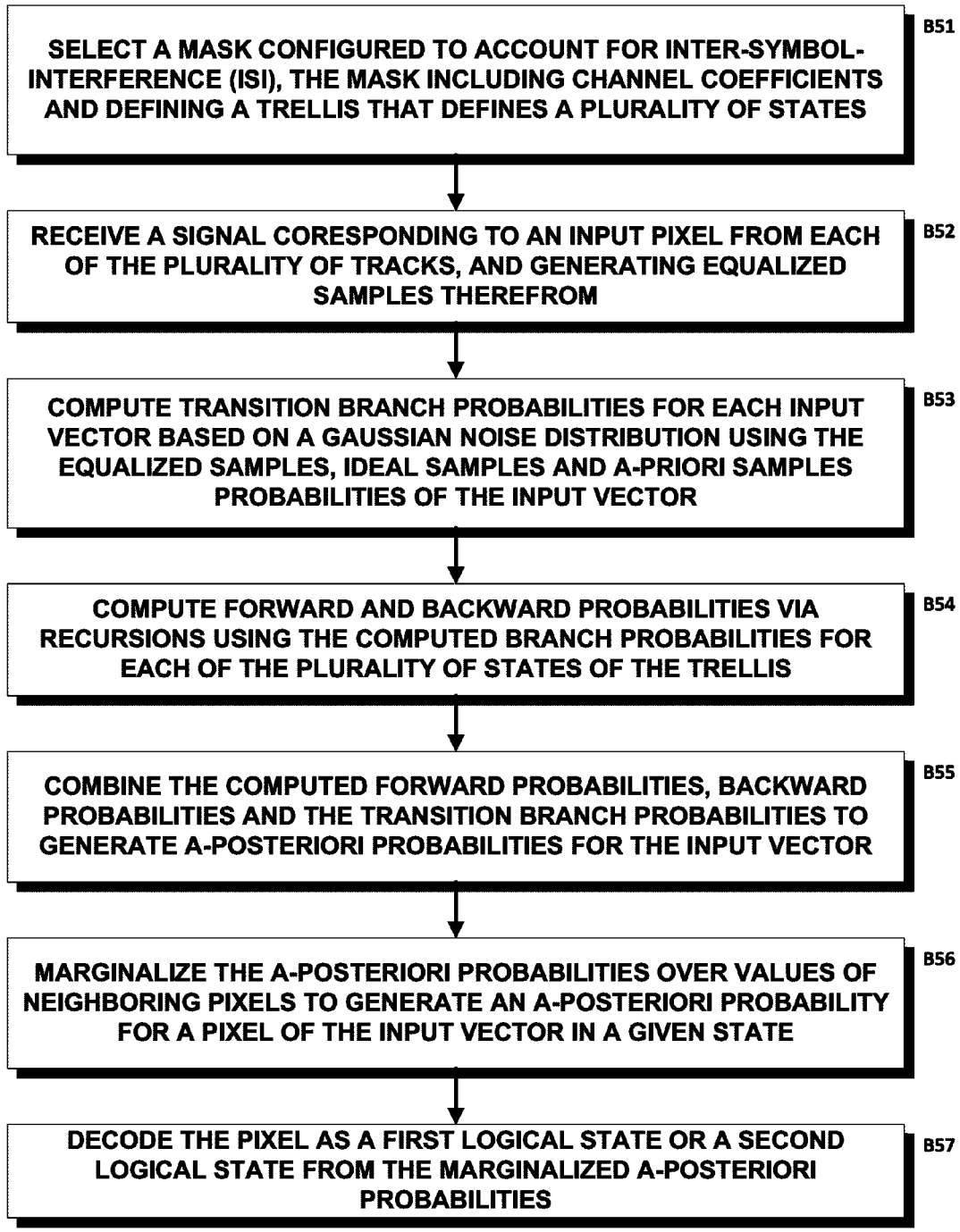
FIG. 5 is a flowchart for a computer-implemented method of decoding data written over a plurality of tracks of a disk of a hard disk drive, according to one embodiment.

FIG. 5 is a flowchart for a computer-implemented method of decoding data written over a plurality of tracks of a disk of a hard disk drive, according to one embodiment. As show therein, FIG. 5 includes a block B51 that calls for, as shown in FIGS. 2(a) through 2(d), selecting a mask configured to account for ISI. In one embodiment, the mask includes selected channel coefficients and defines a trellis that defines a plurality of states.

As shown in Block B52, a signal is then received, and equalized samples are generated from the received signal. That is, the received signal may correspond to an input pixel of a current state from each of the plurality of tracks. The received signal may be analog-to-digital converted, filtered through a Finite Impulse Response (FIR) filter and equalized to generate the equalized samples.

Transition branch probabilities (from a current state s' to a next state s) may then be computed for each input vector based on a Gaussian noise distribution using the equalized samples, ideal samples and a priori probabilities of the input vector, as shown at Block B53. According to one embodiment, the ideal samples may be computed by convolving the input vector with a 2-D partial response target. Block B54 calls for computing forward and backward probabilities, according to equations (8), (9) and (10) above, via 2-D recursions using the computed transition branch probabilities for each of the plurality of states of the trellis. Each iteration of the recursion may utilize the results from the last recursion, as set forth in equations (9) and (10) above. As shown in block B55, the computed forward probabilities, backward probabilities and the transition branch probabilities may then be combined, to generate a-posteriori probabilities for the input vector, as defined in equation (11) above. As shown at block B56 and as defined in equation (12) above, the a-posteriori probabilities may then be marginalized over values of neighboring pixels to generate an a-posteriori probability for a pixel of the input vector in a given state. Finally, as called for by block B57 and as defined at equation (13), the pixel may be decoded as a first logical state (e.g., 0 or 1 in a binary system) or a second logical state (e.g., 0 or 1 in a binary system) from the marginalized a-posteriori probabilities.

According to one embodiment, the decoding in block B57 may be carried out by summing each of the plurality of states of the trellis corresponding to the pixel assuming a first value (such as −1, for example) and summing each of the plurality of states of the trellis corresponding to the pixel assuming a second value that is of opposite polarity as the first value (such as +1, for example). A ratio may then be calculated of a sum over most or all the states of the marginalized a-posteriori probabilities corresponding to pixels that are of the first value over a sum of most or all states corresponding to pixels that are of the second value, to obtain an output pixel log likelihood ratio (LLR). From the output pixel LLR (equation (13) above), the input pixel's value may be decoded as a first logical state if the output pixel LLR is greater than 0 and as a second logical state if the output pixel LLR is less than or equal to 0. For example, if the output pixel LLR of equation (13) evaluates to zero, the pixel may be decoded as having a first logical value (0, for example) and if equation (13) evaluates to a value that is greater than zero, the pixel may be decoded as having a second logical value (such as 1, for example).

Figure 6:
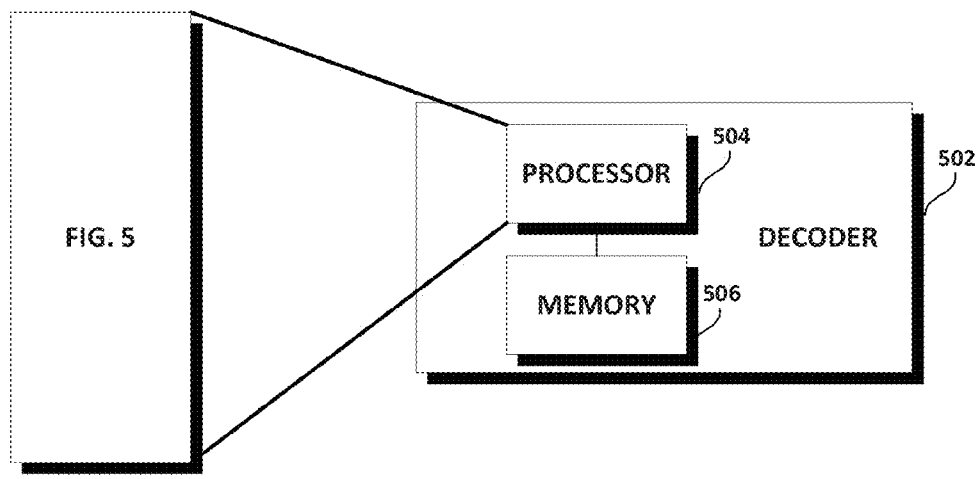
FIG. 6 is a block diagram of a decoder configured to decode data written over a plurality of tracks of a disk of a hard disk drive, according to one embodiment.

FIG. 6 is a block diagram of a decoder configured to decode data written over a plurality of tracks of a disk of a hard disk drive, according to one embodiment. As shown therein, the decoder 502 may include a memory 506 and a processor 504, the processor 504 being coupled to the memory 506. According to one embodiment, the processor 504 may be any combination of hardware, software, and/or firmware that together execute the methods shown and described relative to FIG. 5, as well as 1-4 and 6-9.

Example Embodiments

Practical channels usually have small ISI span. For purposes of computational illustration, in one embodiment, a simple 2-D mask is chosen such that h=[0α0;β1β; 0α0] of size 3×3, and assumed to be symmetric, as shown in FIGS. 2 and 3. For a trellis based on a 3×3 mask h, there are 5 state pixels (i.e., $s_0$ through $s_4$ in FIG. 4), contributing to 32 states configuration and 3 input pixels. The 3 input pixels lead to 8 branches coming into/going out from one state. Also, there are 4 feedback pixels ($\omega_0$, $w_1$, $w_2$, $w_3$), which may be used to compute the state transition probability in the BCJR process. The a-priori information for both the input pixels and the feedback pixels come is from the previous detector. With no feedback, they can be assumed to be zero a-priori. With feedback, extrinsic information from the previous detector will be set as feedback, as discussed hereunder.

The branch metrics may be defined as the squared Euclidean distances (SEDs) between the branch output vectors and the received pixel vectors $\underline{y}_{i,j} \triangleq [y_{i-1,j-1}, y_{i,j}, y_{i+1,j-1}]$. As shown in FIG. 4, $y_{i,j}$ corresponds to the position of $s_1$ or $s'_0$, while $y_{i-1,j-1}$ corresponds to the position of $s'_3$ and $y_{i-1,j+1}$ corresponds to $s'_4$.

For the 3×3 mask shown in FIG. 4, equation (15) may be modified as $$P(\underline{y}_{i,j} \mid S_j = s, S_{j-1} = s') = \qquad (19)$$

$$\begin{cases} \text{For simplified } MAP \text{ trellis} \\ \sum_{\omega_0, \omega_1} P(\omega_0) P(\omega_1) P(y_{i,j} \mid s, s' \overline{y_{i,j}}(\omega_0, \omega_1)) \\ \text{For } MAP \text{ trellis (three-rows version)} \\ P(y_{i,j} \mid s, s' \overline{y_{i,j}}) \times \left[ \sum_{\omega_0, \omega_1} P(\omega_0) P(\omega_1) \right. \\ \left. P(y_{i-1,j-1} \mid s, s', \overline{y_{i-1,j-1}}(\omega_0, \omega_1)) \right] \times \\ \left[ \sum_{\omega_2, \omega_3} P(\omega_2) P(\omega_3) P(y_{i+1,j-1} \mid s, s', \overline{y_{i+1,j-1}}(\omega_2, \omega_3)) \right]. \end{cases}$$

In equation (19), the expectations of the terms within the Gaussian conditional probabilities are computed based on the states definitions, the feedback pixels for the corresponding trellis and the 3×3 mask h, as shown in FIG. 4 as follows:

$\overline{y_{i,j}}(\omega_0, \omega_1) = s_1 \alpha(\omega_0 + \omega_1 + \beta(s'_1 + s_0));$ $\overline{y_{i,j}} = s_1 + \alpha(s_3 + s_4) + \beta(s_0 + s_2);$ $\overline{y_{i+1,j-1}}(\omega_0, \omega_1) = s'_3 + \alpha(\omega_1 + s'_1) + \beta(\omega_0 + s_3);$ $\overline{y_{i+1,j-1}}(\omega_2, \omega_3) = s'_4 + \alpha(\omega_3 + s'_1) + \beta(\omega_2 + s_4).$  (20)

All the Gaussian probabilities above have the same variance.

The multi-row trellis shown in equation (19) processes three adjacent data tracks simultaneously. In the computation of $P(\underline{y}_{i,j} \mid S_j = s, S_{j-1} = s')$, $\underline{y}_{i,j}$ may be defined as $\underline{y}_{i,j} = [y_{i-1,j-1}, y_{i,j}, y_{i+1,j-1}]$. For convenience, this non-iterative 2-D detection embodiment that processes three adjacent data tracks simultaneously is denoted 'algorithm B'.

However, for the 'one-row version' embodiment that only processes one single data track, the trellis definition in FIG. 4 will only keep the central three rows, and all the feedback pixels will disappear, and only the expectation of is needed to compute is the state transition probability. The computation in equation (19) may then be modified as:

$$P(y_{i,j} \mid S_j = s, S_{j-1} = s') = \frac{1}{\sqrt{2\pi} \, \sigma_\omega} \exp\left(-\frac{(y_{i,j} - \overline{y_{i,j}})^2}{2\sigma_\omega^2}\right), \qquad (21)$$

where the $y_{i,j}$ is just the received sample from one single data track, and $\overline{y_{i,j}} = s_1 + \alpha(s_3 + s_4) + \beta(s_0 + s_2)$. For convenience, this non-iterative 2-D detection embodiment that processes a single track is denoted as 'algorithm A'.

The relation between the 'one-row' version embodiment and 'three-rows' version embodiment may be also be generalized to arbitrary 2D ISI channels. In one or more embodiments, the best performance may be obtained by processing R adjacent rows (data tracks) simultaneously, where R=max $(2K_1+1, 2K_2+1)$, but with the highest complexity.

Turbo Based Detection

Figure 7:
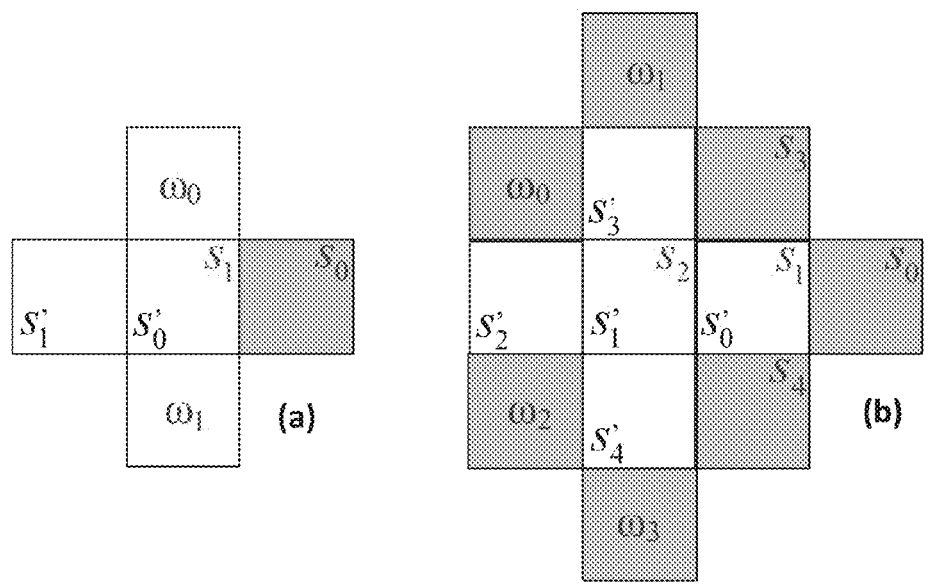
FIG. 7 is a simplified MAP trellis showing a-priori information from a previous detector and a MAP trellis also showing a-priori information from a previous detector, according to one embodiment.

One embodiment is based on a 2-D iterative scheme that takes advantage of different error decisions and noise distribution at the output of the row and column detectors. FIG. 7 is a simplified MAP trellis showing a-priori information from a previous detector and a MAP trellis also showing a-priori information from a previous detector, is according to one embodiment. In FIG. 7, the pixels needing the a-priori information, for the simplified MAP trellis of part (a) of FIG. 7, are $S_j = \{s_0, s_1\}$ and $=\{s'_0, s'_1\}$, and for the MAP trellis of part (b) of FIG. 7, are $S_j = \{s_0, s_1, s_2, s_3, s_4\}$ and $=\{s'_0, s'_1, s'_2, s'_3, s'_4\}$. For a turbo based iterative embodiment, needed is the probability of the input pixel(s) (as part of the trellis), $s_0$ in part (a) of FIG. 7 and $s_0$, $s_3$, $s_4$ in part (b) of FIG. 7 and the probability of the feedback pixels (outside of the trellis), $\omega_0, \omega_1$ in part (a) of FIG. 7 and $\omega_0$ through $\omega_3$ in part (b) of FIG. 7. Scaled extrinsic information coming from the previous detector may be used in the iterative embodiment. When computing the probability of the corresponding pixels using the a-priori information (i.e., the probabilities of all the feedback pixels in equation (19) and $P(u_{i,j})$ in equation (14)), it is assumed that the pixels are statistically independent.

According to one embodiment, to compute the a-priori probability for a specified pixel $y_{i,j}$ from the incoming extrinsic information of this pixel $L_e^{in}(y_{i,j})$, the following equations may be applied:

$$P(y_{i,j} = +1 \mid \tilde{y}_{i,j}) = \frac{\exp(L_e^{in}(y_{i,j}))}{\exp(L_e^{in}(y_{i,j})) + 1}; \qquad (22)$$

$$P(y_{i,j} = -1 \mid \tilde{y}_{i,j}) = \frac{1}{\exp(L_e^{in}(y_{i,j})) + 1}.$$

where $\tilde{y}_{i,j}$ denotes the a-priori information on pixel $y_{i,j}$. For convenience, the iterative 2-D detection embodiment that computes y's using the equation (19) taking account of the a-priori information for both the feedback pixels and $P(u_{i,j})$ is denoted herein 'algorithm D' in Table 1 herein below and in FIG. 9. The iterative algorithm using only the a-priori information of the feedback pixels is denoted 'algorithm C'.

A state is defined comprising of two adjacent pixels $s_0$ and $s_1$ in the row direction as shown in FIG. 3; an input pixel that is the branch connecting two neighboring states determines the next state. To fit into the shape of a local 2-D ISI (the 'band-aid' shape), two extra feedback pixels may be added ($\omega_0, \omega_1$) besides the pixels comprising of the trellis states and inputs. The state transition probability may be computed using the equation (19). The a-priori information on both the feedback pixels and $P(u_{i,j})$ is used. This simplified scheme is referred to as 'algorithm E' in Table 1 and FIG. 9.

Figure 8:
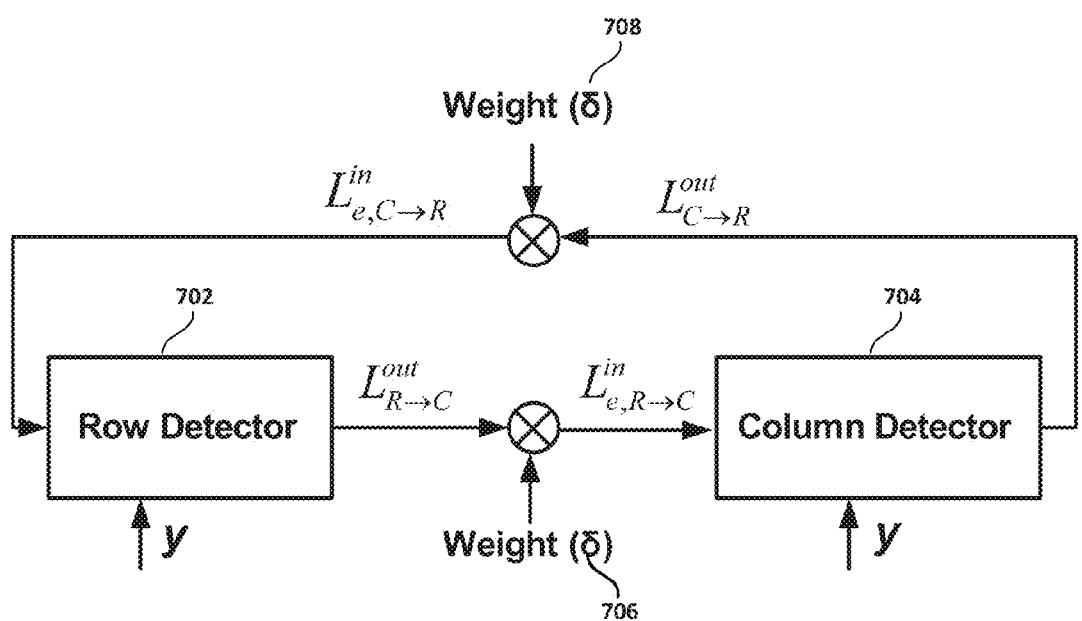
FIG. 8 shows a block diagram of an iterative 2-D turbo detector, according to one embodiment.

FIG. 8 shows a block diagram of an iterative 2-D turbo detector, according to one embodiment. The row detector 702 and the column detector 704 pass soft extrinsic information (LLRs) between each other with LLR scaling on the soft extrinsic information. Accordingly, in an iterative turbo-based detection embodiment, the output pixel LLR (equation (13)) constitutes an output of a row detector 702. According to one embodiment, a column detector may be configured to be similar to the row detector 702, but for processing transposed equalized samples and a transposed mask. The output pixel LLR from the row detector 702 may be converted into first extrinsic LLR that is input to the column detector 704 as a-priori information for the column detector 704. The output pixel LLR output from the column detector 704 may then be converted into second extrinsic LLR that is input back to the row detector 702 as a-priori information for the row detector 702, as shown. Additional iterations may follow the same pattern. According to one embodiment, the output of the row detector 702 may be scaled or weighted by a first weighting factor 706 and the output of the column detector may be scaled or weighted by a second weighting factor 708.

The scaling process (i.e. weight) on the extrinsic information (LLRs) may be used to avoid quick convergence during iterative detection. The weights δ 706, 708 may be effective to lower the magnitude of the 'bad' LLRs with high magnitude in opposite polarity that may propagate into the next detection cycle. The performance tends to converge after several turbo iterations.

In the turbo embodiment, the log-likelihood ratio L(i, j) may be split into a term that depends on the incoming extrinsic information $L_e^{in}(y_{i,j})$ to the current (row or column) detector 702, 704, and a term that does not. Hence, $L_e^{in}(y_{i,j})$ may be subtracted from L(i, j) to form the extrinsic information $L^{out}(i, j)$ that may be passed to the next detector as the extrinsic information, $$L_{out}(i,j) = L(i,j) - L_e^{in}(i,j). \quad (23)$$

The same process may be carried out for one or more of the iterative 2-D detection embodiments disclosed herein.

Complexity Analysis

One embodiment is a low complexity 2-D detection algorithms employing 1-D MAP technique operating over rows and columns within a turbo iteration framework to realize a 'near true 2-D detection' performance. A size N×N binary source image may be used for complexity test. The length of the trellis within a single row is N. Operating over the entire image with N rows, the data may be processed N×N times. The complexity comparison between different algorithms is summarized in Table 1 below. The comparison unit is 'per detector per iteration', since some algorithms employ iterative schemes with more than one detector in a single iteration.

Simulation Results

Monte Carlo simulation of the 2-D detection algorithms were carried out and the results thereof compared. All simulations employ a random 64×64 binary source image x(m, n)∈{−1, +1}. All of the images have a boundary corresponding to the mask size, so that the trellis may start and end at an 'all −1' state. The Signal-To-Noise Ratio (SNR) may be defined as:

$$SNR = 10\log_{10}\left(\frac{\|hx\|^2}{\sigma_\omega^2}\right) \quad (24)$$

$$= 10\log_{10}\left(\frac{\sum_{i,j} h^2(i,j)}{\sigma_\omega^2}\right)$$

where $\sigma_\omega^2$ is the variance of the Gaussian r.v.s ω (m, n) in Equation (2). It is assumed that α=β in the 3×3 mask h, for simulation purposes.

TABLE 1

Computational Complexity Comparison of Different 2-D Detection Algorithms (with an N × N binary Source Image and 3 × 3 ISI)

| Algorithm | Algorithm E | Algorithm A | Algorithm B | Algorithm D |
| --- | --- | --- | --- | --- |
| add/subtract | 212·$N^2$ | 4384·$N^2$ | 10016·$N^2$ | 14368·$N^2$ |
| multiply/divide | 281·$N^2$ | 5889·$N^2$ | 15105·$N^2$ | 19457·$N^2$ |
| exp/log | 177·$N^2$ | 257·$N^2$ | 2305·$N^2$ | 11009·$N^2$ |

Iterative algorithms C and D employ a 5-iteration scheme with a weight σ=0.8 for extrinsic information scaling; while algorithm E uses a 10-iteration scheme with weight σ=0.5. The performance of the algorithms converges; i.e., no more significant SNR gain, after these numbers of iterations discussed herein. The three-row non-iterative version 'algorithm B' performs much better than the one-row version 'algorithm is A', since the state transition probability in BCJR algorithm is computed more accurately (i.e. more contributing terms dealing with ISI rather than in the single case). Algorithms C and D spanning multi-rows/columns perform better than algorithm E with simplified trellis because handling multiple row/columns have better 2-D ISI cancellation than a single-row/column iterative detector.

Figure 9:
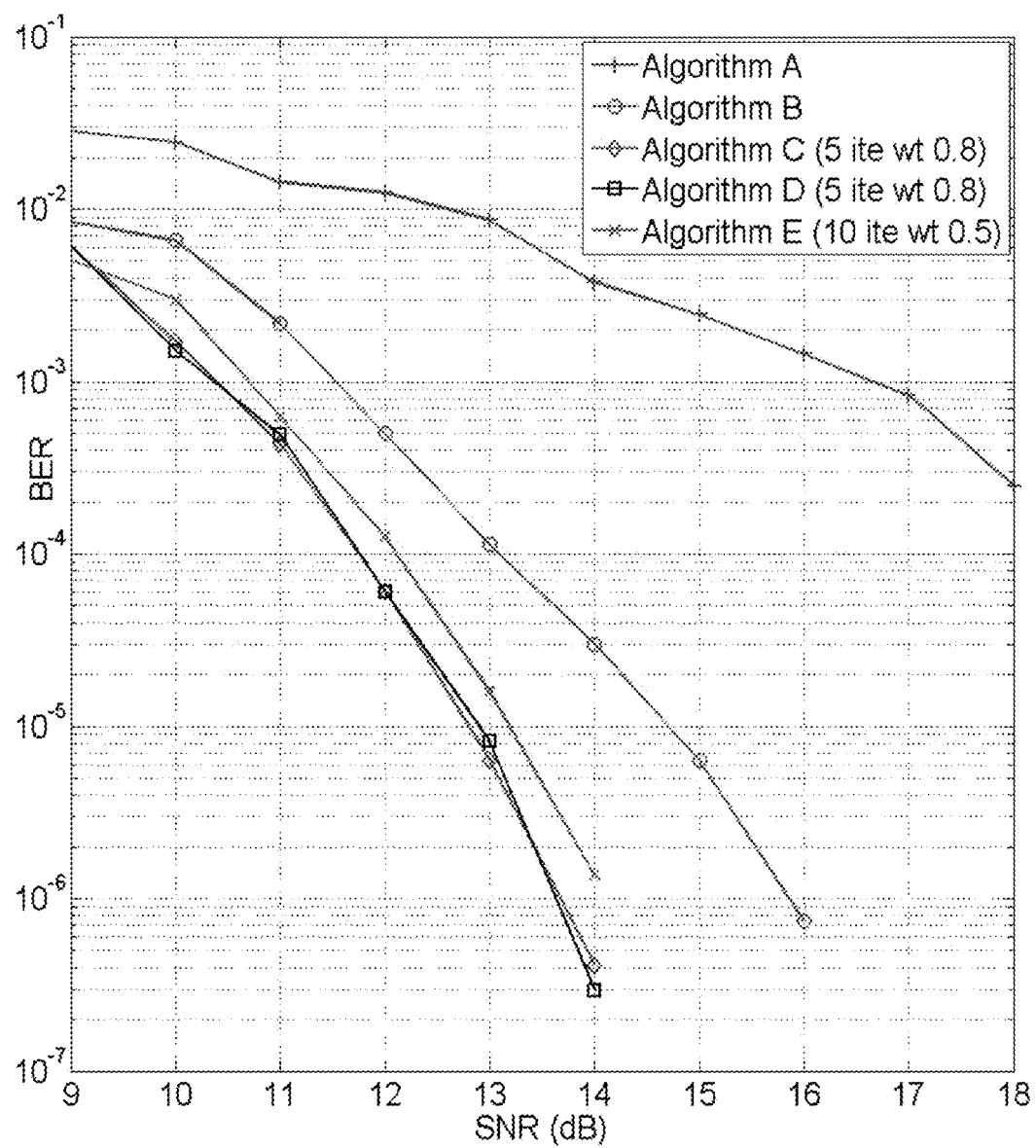
FIG. 9 is a graph showing the results of a Monte Carlo simulation for different detection embodiments.

FIG. 9 shows the results of a Monte Carlo simulation for different detection embodiments. The SNR, in dB is shown on the abscissa, while the Bit Error Rate (BER) is shown on the ordinate. As shown, algorithm E, at BER $10^{-6}$, is just within 0.5 dB of the algorithms C and D. As also shown in FIG. 9, for algorithm C and D, at BER $10^{-6}$, the iterative algorithm is more than 2 dB better than the non-iterative one.

Algorithm E in FIG. 9 has undergone 10 iterations in total. Even after multiplying the complexity numbers in Table I for algorithm E by a factor of 10, the results are still smaller than the numbers for algorithms A and B. Algorithm E is 0.3% as complex as algorithm D with 5 iterations, but with a SNR loss of about 0.5 dB at BER $10^{-6}$ as shown in FIG. 9. Thus, algorithm E can be a good choice considering complexity and performance balance.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the detection methods and detectors described and shown herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example,) may differ from those shown in the figures. Depending on the embodiment, certain of the steps described and shown herein may be removed, while others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of decoding data written over a plurality of tracks of a disk of a hard disk drive, comprising:
   selecting a mask configured to account for Inter-Symbol-Interference (ISI), the mask including channel coefficients and defining a trellis that defines a plurality of states;
   receiving a signal corresponding to an input pixel from each of the plurality of tracks, and generating equalized samples therefrom;
   computing transition branch probabilities for each input vector based on a Gaussian noise distribution using the equalized samples, ideal samples and a priori probabilities of the input vector;
   computing forward and backward probabilities via recursions using the computed transition branch probabilities for each of the plurality of states of the trellis;
   combining the computed forward probabilities, backward probabilities and the transition branch probabilities to generate a-posteriori probabilities for the input vector;
   marginalizing the a-posteriori probabilities over values of neighboring pixels to generate an a-posteriori probability for a pixel of the input vector in a given state, and
   decoding the pixel as a first logical state or a second logical state from the marginalized a-posteriori probabilities.

2. The computer-implemented method of claim 1, wherein the decoding includes:
   summing each of the plurality of states of the trellis corresponding to the pixel assuming a first value and summing each of the plurality of states of the trellis corresponding to the pixel assuming a second value that is of opposite polarity as the first value;
   calculating a ratio of a sum over all the states of the marginalized a-posteriori probabilities corresponding to pixels that are of the first value and a sum of all states corresponding to pixels that are of the second value to obtain an output pixel log likelihood ratio (LLR), and
   decoding the input pixel as a first logical state if the output pixel LLR is greater than 0 and decoding the current pixels as a second logical state if the output pixel LLR is less than or equal to 0.

3. The computer-implemented method of claim 2, wherein the output pixel LLR constitutes an output of a row detector and wherein the method further comprises configuring a column detector by transposing the equalized samples, transposing the mask and returning to signal receiving to process the transposed equalized samples and the transposed mask, and wherein the output pixel LLR from the row detector is converted into first extrinsic LLR that is input to the column detector as a-priori information for the column detector.

4. The computer-implemented method of claim 3 wherein an output pixel LLR output from the column detector is converted into second extrinsic LLR that is input to the row detector as a-priori information for the row detector.

5. The computer-implemented method of claim 4, further comprising scaling the output of the column detector by a second weighting factor.

6. The computer-implemented method of claim 3, further comprising scaling the output of the row detector by a first weighting factor.

7. The computer-implemented method of claim 1, wherein selecting the mask includes selecting a shape of the mask so as to emphasize ISI contributions of adjacent pixels in an orthogonal direction over adjacent pixels in a diagonal direction.

8. The computer-implemented method of claim 1, wherein selecting the mask includes selecting a shape of the mask so as to emphasize ISI contributions of adjacent pixels in a radial direction.

9. The computer-implemented method of claim 1, wherein selecting the mask includes selecting a shape of the mask to be one of a rectangular and a cross shape.

10. The computer-implemented method of claim 1, wherein selecting the mask includes selecting a shape of the mask to be a hexagonal shape.

11. The computer-implemented method of claim 1, wherein selecting the mask includes selecting a 2-D mask.

12. The computer-implemented method of claim 1, wherein selecting the mask includes selecting one of a 3×3 and a 5×5 mask.

13. The computer-implemented method of claim 1, wherein transition branch probabilities computing includes computing the ideal samples by convolving the input vector with a 2-D partial response target.

14. A disk drive comprising:
   a processor configured to decode data written over a plurality of tracks of a disk of the disk drive, the processor being coupled to a memory and being configured to:
   select a mask configured to account for Inter-Symbol-Interference (ISI), the mask including channel coefficients stored in the memory and defining a trellis that defines a plurality of states;
   receive a signal corresponding to an input pixel from each of the plurality of tracks, and generate equalized samples therefrom;
   compute transition branch probabilities for each input vector based on a Gaussian noise distribution using the equalized samples, ideal samples and a priori probabilities of the input vector;
   compute forward and backward probabilities via recursions using the computed transition branch probabilities for each of the plurality of states of the trellis;
   combine the computed forward probabilities, backward probabilities and the transition branch probabilities to generate a-posteriori probabilities for the input vector;
   marginalize the a-posteriori probabilities over values of neighboring pixels to generate an a-posteriori probability for a pixel of the input vector in a given state, and
   decode the pixel as a first logical state or a second logical state from the marginalized a-posteriori probabilities.

15. The disk drive of claim 14, wherein the processor is further configured to:
   sum each of the plurality of states of the trellis corresponding to the pixel assuming a first value and sum each of the plurality of states of the trellis corresponding to the pixel assuming a second value that is of opposite polarity as the first value;
   calculate a ratio of a sum over all the states of the marginalized a-posteriori probabilities corresponding to pixels that are of the first value and a sum of all states corresponding to pixels that are of the second value to obtain an output pixel log likelihood ratio (LLR), and
   decode the input pixel as a first logical state if the output pixel LLR is greater than 0 and decode the current pixels as a second logical state if the output pixel LLR is less than or equal to 0.

16. The disk drive of claim 15, wherein the output pixel LLR constitutes an output of a row detector and wherein the decoder further comprises a column detector and wherein the processor is further configured to transpose the equalized samples, transpose the mask and return to signal receiving to process the transposed equalized samples and the transposed mask, and wherein the processor is further configured to convert the output pixel LLR from the row detector into first extrinsic LLR that is input to the column detector as a-priori information for the column detector.

17. The disk drive of claim 16, wherein the processor is further configured to convert an output pixel LLR output from the column detector into second extrinsic LLR that is input to the row detector as a-priori information for the row detector.

18. The disk drive of claim 17, wherein the processor is further configured to scale the output of the column detector by a second weighting factor.

19. The disk drive claim 16, wherein the processor is further configured to scale the output of the row detector by a first weighting factor.

20. The disk drive of claim 14, wherein the processor is further configured to select a shape of the mask so as to emphasize ISI contributions of adjacent pixels in an orthogonal direction over adjacent pixels in a diagonal direction.

21. The disk drive of claim 14, wherein the processor is further configured to select a shape of the mask so as to emphasize ISI contributions of adjacent pixels in a radial direction.

22. The disk drive of claim 14, wherein the processor is further configured to select a shape of the mask to be one of a rectangular and a cross shape.

23. The disk drive of claim 14, wherein the processor is further configured to select a shape of the mask to be a hexagonal shape.

24. The disk drive of claim 14, wherein the processor is further configured to select a 2-D mask.

25. The disk drive of claim 14, wherein the processor is further configured to select one of a 3×3 and a 5×5 mask.

26. The disk drive of claim 14, wherein the processor is configured to compute the ideal samples by convolving the input vector with a 2-D partial response target.

* * * * *